March 20, 1928.  
W. A. RIDDELL  
PHOTOGRAPHIC SHUTTER  
Filed Jan. 12, 1923

INVENTOR.  
William A. Riddell  
BY  
Frederick S. Crunch  
his ATTORNEY

March 20, 1928.
W. A. RIDDELL
1,663,178
PHOTOGRAPHIC SHUTTER
Filed Jan. 12, 1923
3 Sheets-Sheet 2
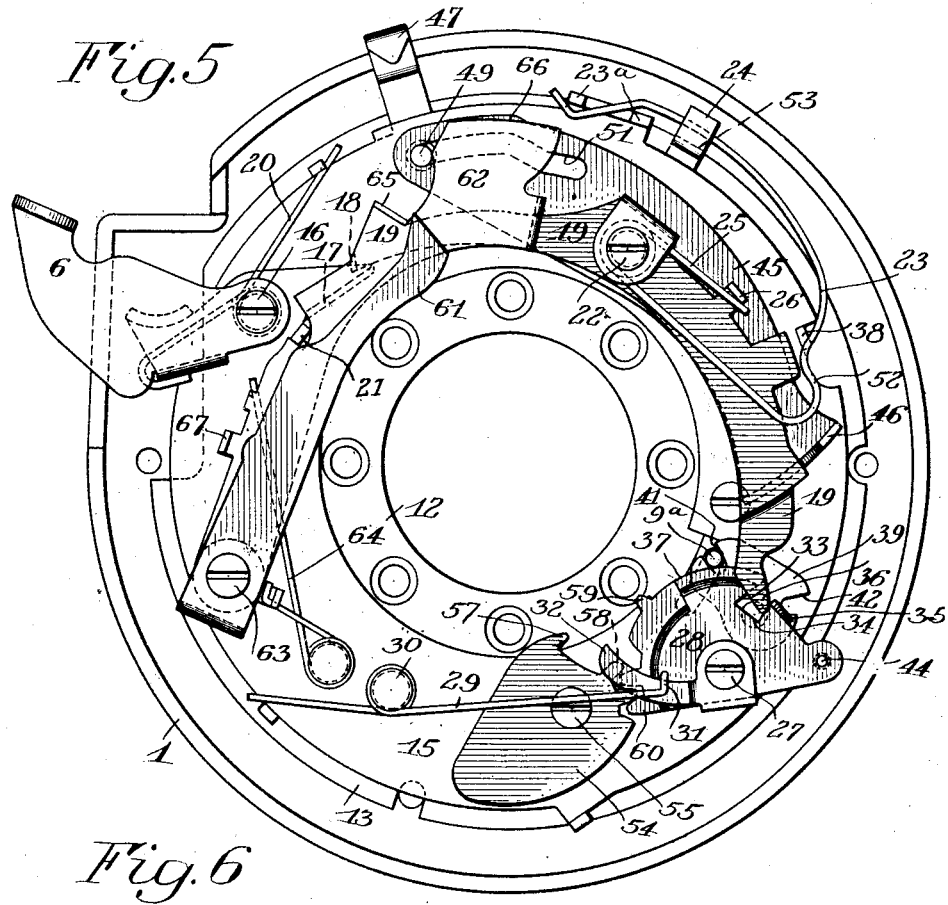
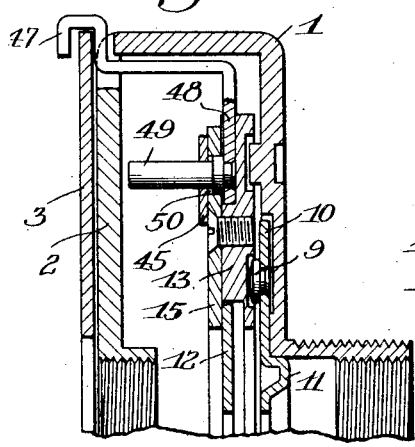
INVENTOR.
William A. Riddell
BY
his ATTORNEY March 20, 1928.

W. A. RIDDELL 1,663,178

PHOTOGRAPHIC SHUTTER

Filed Jan. 12, 1923

INVENTOR.
William A. Riddell
BY
his ATTORNEY

Patented Mar. 20, 1928.

1,663,178

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER.

Application filed January 12, 1923. Serial No. 612,218.

My present invention relates to photography and more particularly to photographic shutters being especially adapted to the modern type of pivoted blade, opposite movement, symmetrical opening shutter housed in an annular case and it has for its object to simplify and improve the operating mechanism thereof particularly with reference to instantaneous or automatically timed exposures. Further objects of the invention are to improve the connection between the actuating mechanism and the blade mechanism and between the actuating mechanism and the retarding device. To these and other ends the invention resides in certain improvements and combinations of parts all as will be hereinafter more fully described, the novel features being pointed out in the claims at the end of the specification.

In the drawings:

Figure 5 is a view similar to Figure 3 but with the parts in another position, the blades being open;

Figure 6 is a fragmentary section taken substantially on the line 6—6 of Figure 3;

Figures 7, 8, 9 and 10 are detail views illustrative of a certain cam action;

Similar reference numerals throughout the several views indicate the same parts.

Figure 1:
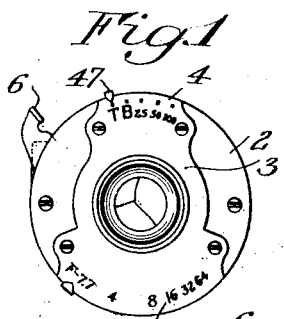
Figure 1 is a front view of a shutter constructed in accordance with and illustrating one embodiment of my invention.
Figure 2:
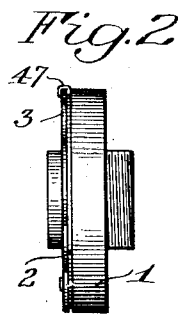
Figure 2 is a side view thereof.

The shutter constituting the present embodiment of the invention is a symmetrical opening pivoted blade diaphragm shutter housed in the usual annular case 1 closed by a front cover plate 2 on which is a plate 3 carrying the time scale 4 and the diaphragm scale 5. Though features of my invention are applicable to both set shutters and automatic shutters, the one shown is of the latter type, the operating member being indicated at 6.

Figure 11:
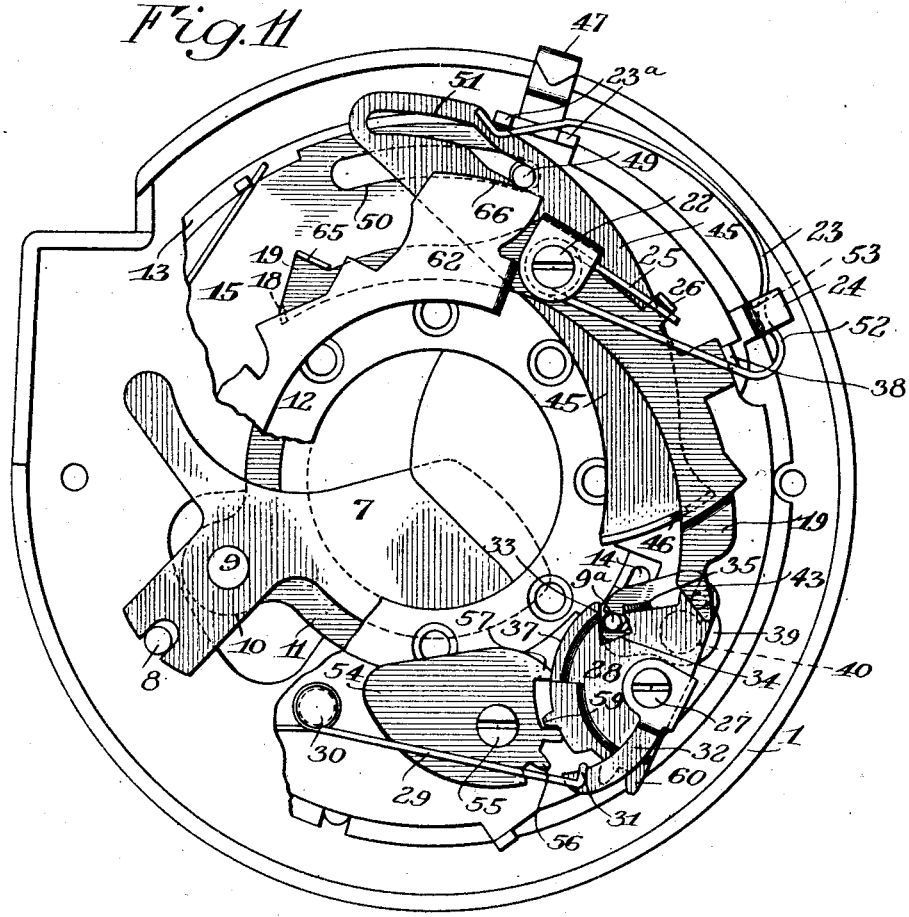
Figure 11 is another view similar to Figure 3 with parts removed and others broken away and Figure 12 is a sectional view taken substantially on the line 12—12 of Figure 3.

The specific blade mechanism used is not important to a disclosure of the invention but is partially shown in Figure 11. The blades 7 turn against the bottom of the case on fixed pivots 8 on the latter and movable fulcrum pins 9 carried on extensions 10 of a rotary ring 11 having a limited movement. Ring 11 is shown in section in Figure 6 but the blades are omitted. It is arranged beneath the diaphragm ring 12 and a partition member 13 in which the latter turns, (see Figure 6). As the ring 11 is moved back and forth the blades open and close and for the purpose of being so actuated one of the pivot pins 9 is extended upwardly to project through a slot 14 in the partition member as indicated at $9^a$ forming a blade ring abutment to cooperate with the actuating mechanism hereinafter described.

The mechanism is supported in the present instance entirely by a bridge ring 15. Pivoted thereto at 16 is the operating member 6 provided with a knife edge 17 permitting it to slip under a downwardly turned abutment 18 on a master lever 19 when the said operating member is returned by a spring 20 coiled about its pivot, its normal position being defined by a stop lug 21 on the plate 15. When the operating member is depressed to cause the shutter to perform it engages the abutment 18 on the master lever and rocks the latter a prescribed distance finally slipping off of it and returning in the manner described.

The master lever 19 is pivoted at 22 to the bridge plate and actuated by a spring 23 coiled about its pivot and having a long end engaged at a distant point with lugs $23^a$ and 24 on the bridge ring for purposes that will hereinafter appear. The other short end 25 engages an ear 26 on the master lever.

Figure 3:
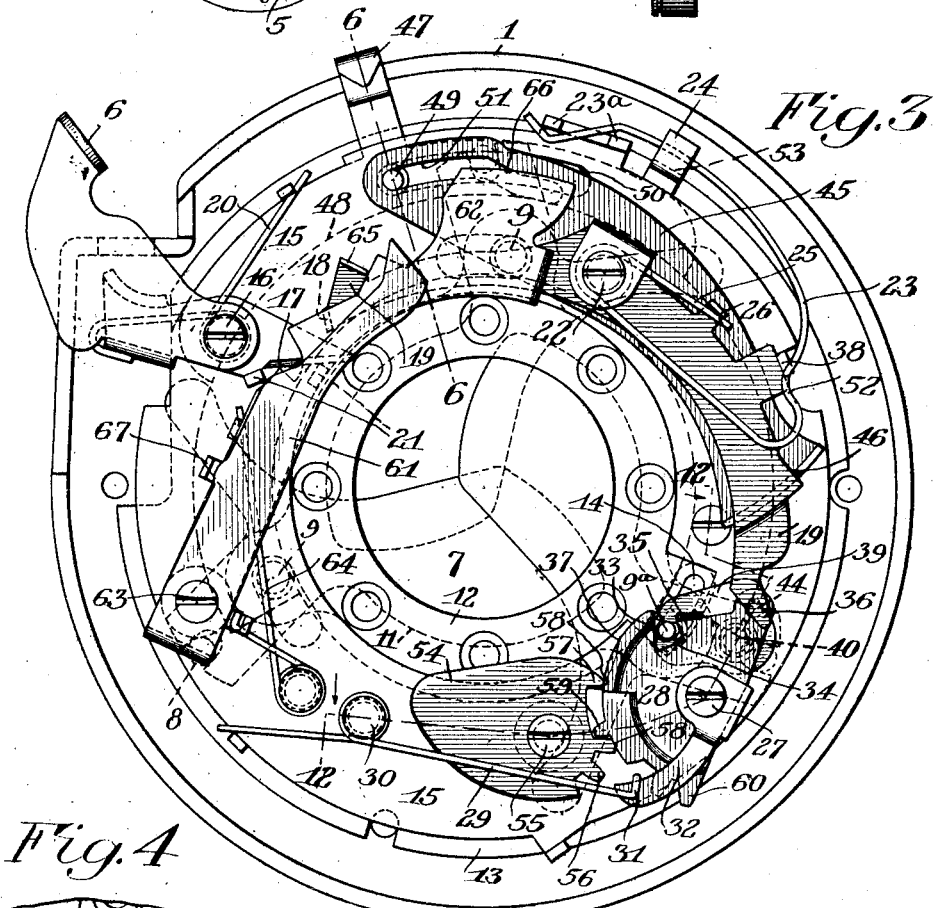
Figure 3 is an enlarged front view of the interior mechanism in normal position with the cover plate of the shutter casing removed.
Figure 12:
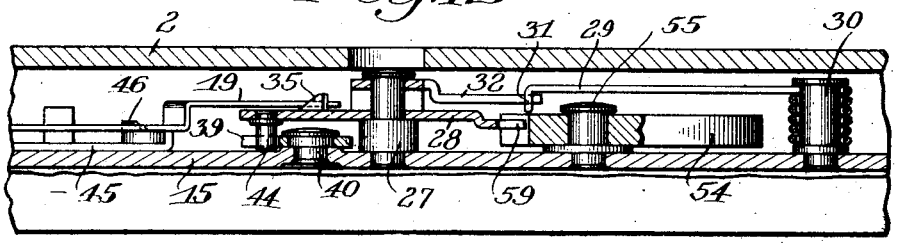

Near the free end of the master member is pivoted to the ring 15 at 27 a segmental blade ring actuator 28 normally held in the position of Figure 3 by a long spring arm 29 carried on a post 30 and having a hooked end 31 slidably engaging a substantially radial but slightly curved arm 32 on the actuator. On the opposite side of the pivot the actuator is provided with a shoulder 33 forming one wall of a recess 34 in which normally lies the pin or abutment $9^a$ of the blade ring as shown in Figure 3. Adjacent to this recess the actuator is further provided with an upstanding ear 35 constituting a cam shoulder of the conformation as shown in Figure 12.

When the shutter is operated through the operating member 6 and the master member 19 is thereby raised through a definite arc, the appropriately shaped free end 36 thereof rides over the cam shoulder 35 by yielding laterally and snaps into engagement therewith, the master member being resiliently flexible for this purpose. The master member being immediately released by the operating member with the same movement as previously described and its spring 23 being superior to the spring 29 of the actuator 28 the latter is carried around in a clockwise direction to the position of Figure 5, the shoulder 33 first quickly carrying the blade ring abutment 9ª to the opposite end of its slot 14 and opening the blades. There ensues an interval of lost motion between the actuator and the blade ring during which the blade ring abutment 9ª rides or dwells on a concentric surface 37 of the actuator and thereby locks the blades in the open position while the actuator is moving idly in the same direction. Ultimately, the master member slips off of the shoulder 35 of the actuator and comes to rest against its stop 38 in the normal position. Upon being released, the actuator 28 returns to its previous position under the influence of its spring 29 acting with progressively increasing mechanical advantage on the arm 32 and it returns the blade ring and closes the blades, not directly, but through the medium of a second actuator.

Figure 4:
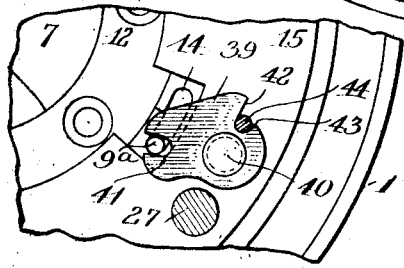
Figure 4 is an enlarged fragmentary detail of a part of the blade ring actuating mechanism.

This second actuator is best shown in Figure 4 and consists of a swinging plate 39 pivoted at 40 to the bridge plate 15 to lie partially beneath the actuator 28. A forked portion 41 thereon is in constant engagement with the blade ring abutment 9ª and moves with it as the blades are open. It is also provided with a shoulder 42 forming one wall of a recess 43 in which normally rests a pin 44 carried on the under side of the actuator 28. The two actuators turn on different centers but during the initial movement of the actuator 28 the pin 44 is carried out of the recess 43 and finally leaves the shoulder 42 altogether as shown in Figure 5 while the blade ring abutment 9ª is dwelling on the surface 37. When the actuator 28 is released by the master member, however, and flies back under the influence of its own spring, it strikes the shoulder 42 and turns the actuator 39 also to the normal position of Figures 3 and 4 closing the blades. At this point the mechanical advantage of the spring 29 on the arm 32 is considerably increased with the result that the blades close very quickly just as they open with maximum rapidity when the actuator is first engaged by the master member with the spring of the latter flexed to its greatest tension.

The purpose of the lost motion connection between the actuator 28 and the blade ring following the opening of the blades is to give opportunity for variably timing the duration of the exposure. This latter depends in part upon the duration of the engagement of the master member with the actuator; in part upon the tension of the master spring 23 and in part upon the influence of certain retarding mechanism to be hereinafter described. In the practice of my present invention I do not have the master member slip endwise off of the shoulder 35 of the actuator but laterally in a direction transverse to the swinging movement and I arrange for regulating the point at which it will do so, so that it will either release the actuator immediately the blades are open and allow it to quickly close them by its return movement for an instantaneous exposure or carry the actuator through a longer period of lost motion with respect to the blade ring and produce an exposure of longer duration. This is accomplished through the medium of a cam lever 45 (see Figure 11) turning in the present instance on the pivot 22 of the master member and provided at one end beneath the free end of the latter with a cam 46. This cam is adjusted into any desired more or less advanced position in the path of the end 19 of the master member as shown in Figures 7 to 10. If retracted to the position of Figure 7 the master member will travel some distance before it rides on the shoulder of the cam and slips off of the shoulder 35 of the actuator. If advanced to the intermediate position of Figure 8 to the extreme position of Figure 9 the master member will barely nick the actuator and release it as soon as the blades are fairly open. Figure 10 merely shows the position of the master member on the cam when it has been fully released after operating from the adjustment of Figure 9.

The adjustment of the timing cam is effected from the exterior in the usual manner by manipulating a time indicator arm 47 cooperating with the time scale 4. This arm is extended from a fragmentary annulus 48 having a suitable bearing beneath the bridge plate 15 to rotate within a limited arc (see Figure 6). It is provided with a pin 49 extending through a slot 50 in the bridge plate and cooperating with a cam slot 51 in the end of the cam arm or lever 45 which is opposite to the cam 46. As the arm 47 is adjusted the pin 49 travelling in the slot 51 swings the cam lever in one direction or the other for the desired time adjustment.

At the same time the movement of the arm 47 performs another time regulating function. The long end 23 of the master lever spring is of the peculiar curved shape shown presenting a cam shoulder at 52. When the arm 47 is moved to an extreme position at the right advancing the cam 46 so far into the path of the master lever as to give the shortest exposure a projecting flanged finger 53 on the annulus 48 rides along the spring arm 23 say from the position of Figures 3 and 5 to that of Figure 11 and by engaging the cam shoulder 38 forces the spring over so that its tension is increased for the fastest exposure and at a time when the engagement of the master lever with the actuator 28 is of the briefest duration.

There is another point to be noted with respect to the joint action of the returning spring 29 of the actuator 28 and the operating spring 23 of the master member and that is that because of the radial sliding contact of the former at 32, it acts upon the actuator in opposition to the master member at reduced mechanical advantage at a time when the master spring 23 is flexed the least or has a lesser amount of energy stored therein.

Referring now to the retarding device furnishing the third means of automatically regulating the duration of an exposure, this consists in the present instance of a pivoted weight 54 turning on a stud 55 and provided on the side toward the actuator 28 with a plurality of spur teeth 56 and, at a distance therefrom, with a tooth 57. In the same region it is provided with a reentrant cylindrical surface 58 concentric to the pivot 27 of the actuator and adapted to ride on the concentric surface 37 of the actuator. It is thereby locked by the latter in the normal position of Figure 3 and upon each actuation of the shutter it is assured that the actuator will pick up the retarding device at exactly the same point.

The actuator picks up the retarding device, first by the engagement of a tooth 59 on the former with the tooth 57 of the latter, the reentrant surface 58 being formed jointly on the tooth 57 and one of the teeth 56. This kicks the retarding device into motion preparatory to the immediate engagement of spur teeth 60 on the actuator with the teeth 56 on the retarding device and through this intermeshing the principal movement of the retarder is effected as shown in Figure 5. It is obvious that the additional drag of the retarder will not be required or called into operation at the higher speeds but only when the engagement of the master lever with the actuator is prolonged and the lost motion connection between the actuator and retarder is provided for this purpose. At the higher speeds the master lever disengages so quickly that the retarder 54 remains locked and does not move at all, the motion imparted to the actuator being insufficient to move the tooth 59 as far as the tooth 57.

Suitable bulb and time levers for controlling the master member are indicated at 61 and 62 being pivoted at 63 and actuated by a spring 64 in one direction. When operative, they cooperate as stops with an ear 65 on the master lever in the usual manner and are thrown into inoperative positions by the pin 49 on the regulator engaging the time lever 62 and holding such engagement on a surface 66 thereof as shown in Figure 11 during a wide range of adjustment of the regulator or timing lever 47 for the automatically timed speeds. The bulb lever 61 is held out also by engagement of the time lever therewith at 67.

It will be noted that a shutter constructed in accordance with my invention and assembled in the manner of the accompanying showing has its entire operating mechanism carried by the bridge plate 15 upon which it can be inserted in the case as a unit.

I claim as my invention:

1. In a photographic shutter, the combination with a blade mechanism and a blade actuator, of a master member having an operating engagement with the actuator in one direction and a releasing movement therefrom in a relatively transverse direction.

2. In a photographic shutter, the combination with a blade mechanism and a blade actuator, of a laterally flexible master member having an operating engagement with the actuator in the direction of its own plane and a releasing movement therefrom in which it flexes in a relatively transverse direction.

3. In a photographic shutter, the combination with a blade mechanism and a blade actuator, of a pivoted master member having a swinging operating engagement with the actuator, an adjustable cam lever having a cam thereon adapted to cooperate with the master member at different points and release it from the actuator in a direction transverse to the swinging movement of the master member, said cam lever being provided with a cam slot, and a regulating device engaging in the cam slot to control the position of the cam lever.

4. In a photographic shutter, the combination with a blade mechanism and operating mechanism therefor embodying a swinging master member; of an operating spring for the latter having a cam shaped portion and a regulating member adapted to move along the cam portion of the spring to increase or reduce its tension, the path of said member being substantially at right angles to the direction in which the cam portion presses against it when said tension is increased.

5. In a photographic shutter, the combination with a blade mechanism embodying an actuator and operating mechanism therefor embodying a swinging master member adapted to cooperate with the actuator during its swinging movement, of an adjustable device for throwing the master member out of engagement with the actuator at different points in the travel of the master member, an operating spring for the master member and a common regulating device for varying the tension of said spring and the position of the adjustable releasing device.

6. In a photographic shutter, the combination with a blade mechanism embodying an actuator, of a master member adapted to engage the actuator always at the same point, a spring for the master member, adjustable means for releasing the master member from the actuator at different points in their joint movement, and a common regulating device for varying the tension of said spring and controlling the releasing means.

7. In a photographic shutter, the combination with a blade mechanism including an operating abutment, of a swinging actuator having a shoulder adapted to engage the abutment to open the blades and an adjacent concentric surface upon which the abutment dwells during continued movement of the actuator and a second actuator for closing the blades operated by the first actuator when reversed.

8. In a photographic shutter, the combination with a blade mechanism, of an actuator having a lost motion connection therewith adapted to open the blades and to then move idly in the same direction, said actuator being provided with means for locking the blades open during its said idle movement, and a second actuator for closing the blades operated by the first actuator when reversed.

9. In a photographic shutter, the combination with a blade mechanism including an operating abutment, of a swinging actuator having a shoulder adapted to engage the abutment to open the blades and an adjacent concentric surface upon which the abutment dwells during continued movement of the actuator, a master member having a swinging operating engagement with the actuator and adjustable means for causing the master member to slip off of the actuator in a direction transverse to its swinging movement and at different points in the idle movement of the actuator.

10. In a photographic shutter, the combination with a blade mechanism and a pivoted actuator therefor, of a spring acting upon the actuator to close the shutter blades and having a radial sliding contact therewith in which it moves toward the center of the actuator as the blades are opened against its tension and away from the center as the blades are closed.

11. In a photographic shutter, the combination with a blade mechanism, of an actuator having a lost motion connection therewith adapted to open the blades and to then move idly in the same direction, a master member having a slip off operating engagement with the actuator and means for varying the point in the idle movement of the actuator at which the master member disengages therefrom.

12. In a photographic shutter, the combination with a blade mechanism, of an actuator having a lost motion connection therewith adapted to open the blades and to then move idly in the same direction, a master member having a swinging operating engagement with the actuator and adjustable means for causing the master member to slip off of the actuator in a direction transverse to its swinging movement and at different points in the idle movement of the actuator.

WILLIAM A. RIDDELL.